(12) United States Patent
Maruyama (10) Patent No.: US 9,682,708 B2
(45) Date of Patent: Jun. 20, 2017

(54) DRIVING SUPPORT CONTROLLER

(71) Applicant: Fuji Jukogyo Kabushiki Kaisha, Tokyo (JP)

(72) Inventor: Tasuku Maruyama, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/856,378

(22) Filed: Sep. 16, 2015

(65) Prior Publication Data

US 2016/0091896 A1 Mar. 31, 2016

(30) Foreign Application Priority Data

Sep. 29, 2014 (JP) .................................. 2014-198562

(51) Int. Cl.
*G05D 1/00* (2006.01)
*B60W 10/04* (2006.01)
(Continued)

(52) U.S. Cl.
CPC ...... *B60W 30/18163* (2013.01); *B60W 10/04* (2013.01); *B60W 10/20* (2013.01);
(Continued)

(58) Field of Classification Search
CPC ................. B60W 10/04; B60W 10/20; B60W 30/18163; B60W 2540/04; B60W 2710/20; B60W 2720/10
(Continued)

(56) References Cited

U.S. PATENT DOCUMENTS 9,187,117 B2 11/2015 Spero et al.
9,616,924 B2 4/2017 Spero et al.
(Continued)

FOREIGN PATENT DOCUMENTS

CN 103204163 A 7/2013
JP 2000-020898 A 1/2000
(Continued)

OTHER PUBLICATIONS

Japanese Office Action dated Mar. 1, 2016 with an English translation thereof.
(Continued)

*Primary Examiner* — Khoi Tran
*Assistant Examiner* — Robert Nguyen
(74) *Attorney, Agent, or Firm* — McGinn IP Law Group, PLLC.

(57) ABSTRACT

A driving support controller determines whether it is an opportunity to change a traveling lane based on a predetermined condition in an self-driving activated state in which an acceleration, a deceleration, and a steering of a vehicle equipped with the driving support controller can be automatically controlled, and performs a control to present a lane change proposal to an operator of the vehicle when a lane change is determined to be possible. The device performs an automatic lane change control in response to an intention of the operator agreeing to the lane change proposal. In this case, when the operator's intention is determined to be in disagreement with the lane change proposal, the control to present the lane change proposal to the operator is suspended until a predetermined cancelling condition is met.

12 Claims, 5 Drawing Sheets

(51) Int. Cl.
*B60W 10/20* (2006.01)
*B60W 30/18* (2012.01)
*B60W 50/10* (2012.01)

(52) U.S. Cl.
CPC ......... *B60W 50/10* (2013.01); *B60W 2540/04* (2013.01); *B60W 2710/20* (2013.01); *B60W 2720/10* (2013.01)

(58) Field of Classification Search
USPC .......................................................... 701/23
See application file for complete search history.

(56) References Cited

U.S. PATENT DOCUMENTS

| | | | |
|---|---|---|---|
| 9,616,925 | B2 | 4/2017 | Spero et al. |
| 2013/0184926 | A1 | 7/2013 | Spero et al. |
| 2013/0231830 | A1* | 9/2013 | Van Dan Elzen .... B60W 50/14 701/42 |
| 2015/0194055 | A1* | 7/2015 | Maass .................. B60W 50/14 340/905 |
| 2016/0039458 | A1 | 2/2016 | Spero et al. |
| 2016/0039459 | A1 | 2/2016 | Spero et al. |

FOREIGN PATENT DOCUMENTS

| | | |
|---|---|---|
| JP | 2003-063273 A | 3/2003 |
| JP | 2006-178714 A | 7/2006 |
| WO | WO 2014/148025 A1 | 9/2014 |

OTHER PUBLICATIONS

JPO Decision to Grant dated Jul. 5, 2016 with an English translation thereof.
JPO Notification of Reasons for Refusal dated Mar. 1, 2016 with an English translation thereof.
Chinese Office Action dated Mar. 7, 2017, with an English translation thereof.

\* cited by examiner

DRIVING SUPPORT CONTROLLER

CROSS-REFERENCE TO RELATED APPLICATION

The present application claims priority from Japanese Patent Application No. 2014-198562 filed on Sep. 29, 2014, the entire contents of which are hereby incorporated by reference.

BACKGROUND

1. Technical Field

The present disclosure relates to a driving support controller, and particularly to a technical field of an automatic lane change.

2. Related Art

Recently, various kinds of technologies have been proposed for self-driving of vehicles, such as automobiles. There is an automatic lane change as one element of the self-driving. For example, the automatic lane change includes a lane change for a right turn or a left turn associated with a course to a destination, and/or a lane change for passing of a preceding vehicle that is extremely slow in traveling speed or avoiding an obstruction. Japanese Unexamined Patent Application Publication (JP-A) No. 2000-020898 discloses that an automatic control is canceled by an intervening operation by an operator during an execution of the automatic lane change.

SUMMARY OF THE INVENTION

In order to automatically change the lane, it is necessary for a system (e.g., a driving support controller) in the vehicle to detect road information and/or perimeter sensing information and monitor whether it is an opportunity to change the lane under predetermined conditions. If the system determines that the lane change is possible, the system then actually performs the automatic lane change. However, even if the system determines that the lane change is possible, a vehicle operator may not demand the lane change. Thus, before the automatic lane change is executed, the system may be configured to provide an operation to allow the operator to cancel the automatic lane change. However, for example, if the lane changeable situations frequently and repeatedly occur and the automatic lane change is about to be performed, the operator who does not demand the lane change for some reason has to cancel the automatic lane change every time. This is significantly troublesome for the operator.

It is desirable to provide a driving support controller that can reflect an operator's intention when a self-driving function intends to perform an automatic lane change, without imposing a troublesome operation on the operator if the operator does not agree to the lane change.

An aspect of the present disclosure provides a driving support controller including a lane change opportunity determination module that determines whether it is an opportunity to change a traveling lane based on a predetermined condition in an self-driving activated state in which an acceleration, a deceleration, and a steering of a vehicle equipped with the driving support controller can be automatically controlled, and performs a control to present a lane change proposal to an operator of the vehicle when the lane change opportunity determination module determines that a lane change is possible, an operator intention determination module that determines an operator's intension regarding the lane change proposal, and a lane change control module that controls the acceleration, the deceleration and the steering of the vehicle to perform an automatic lane change control in response to a determination of the operator intention determination module that the operator agrees to the lane change proposal. When the operator intention determination module determines that the operator's intention is in disagreement with the lane change proposal, the lane change opportunity determination module suspends the control to present the lane change proposal to the operator until a predetermined cancelling condition is met.

When the operator intention determination module determines that the operator's intention is in disagreement and the lane change control module stops the automatic lane change control after the lane change control module starts the automatic lane change, the lane change opportunity determination module may also suspends the control to present the lane change proposal to the operator until the cancelling condition is met.

The cancelling condition may be a detection of a lane change instruction by the operator and/or an elapse of a preset time.

The lane change opportunity determination module may perform a control to present to the operator that it is the opportunity to change the lane when the lane change opportunity determination module determines that it is the opportunity to change the lane during a period in which the control to present the lane change proposal to the operator is suspended.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Hereinafter, a few instances of a driving support controller mounted to a vehicle will be described. Note that the term "lane" refers to part of a carriageway (roadway) that is designated for use by a single line of vehicles, and, for the sake of explanation, lines drawn on a road surface (i.e., road surface markings, such as a median and lines indicating road shoulders) are referred to as "the lane lines" in order to distinguish them from the lane.

1. Entire System Configuration

Figure 1:
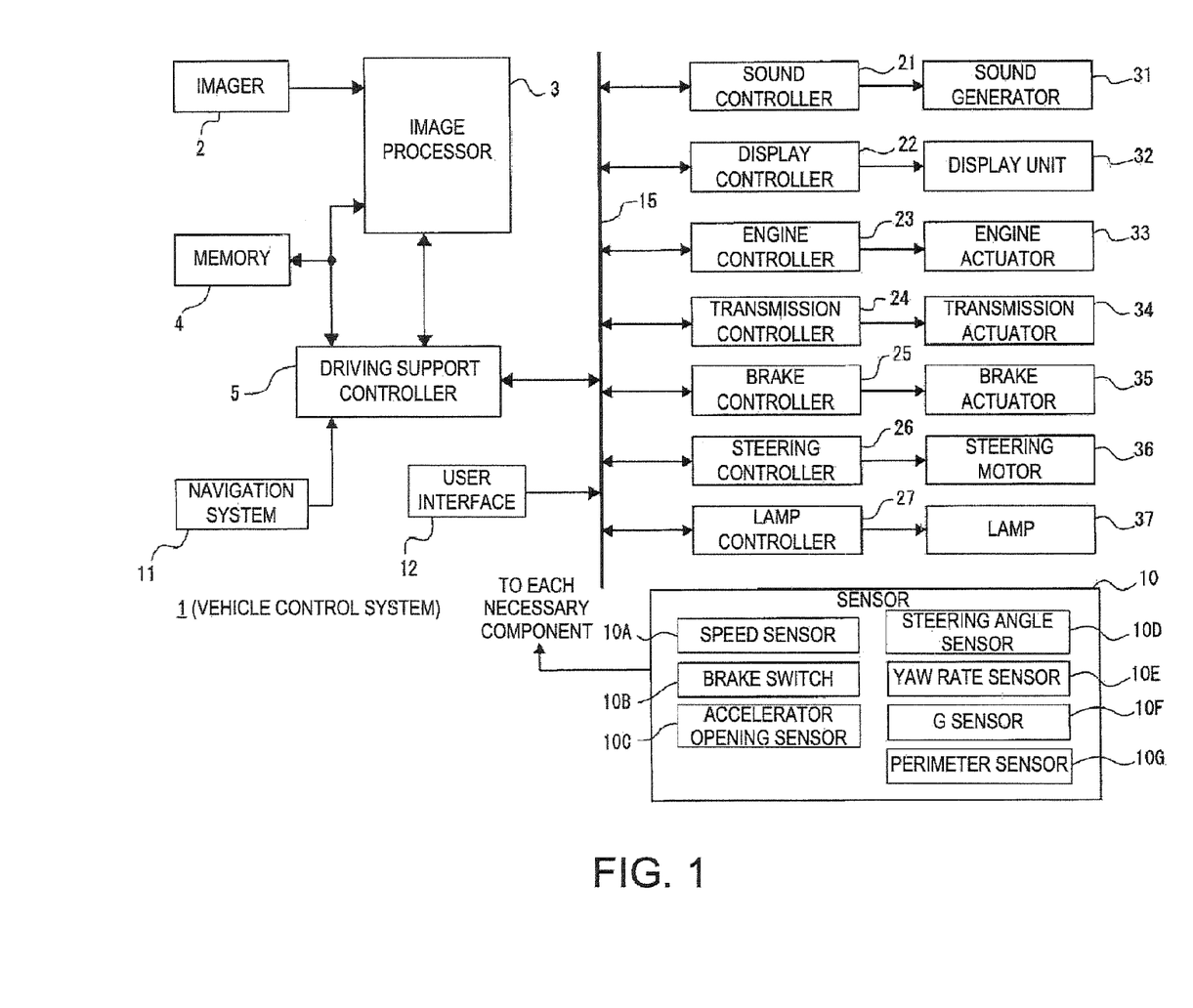
FIG. 1 is a block diagram illustrating a vehicle control system according to one example of the present disclosure.

FIG. 1 illustrates a configuration of a vehicle control system 1 provided with a driving support controller 5 as an example according to the present disclosure. Note that a configuration only of substantial part according to the present example is extracted from the configuration of the vehicle control system 1, and is illustrated in FIG. 1. The vehicle control system 1 includes the following components provided to a vehicle to be controlled in a way of the present disclosure (hereinafter, referred to as "the vehicle). The components include an imager 2, an image processor 3, a memory 4, a sensor 10, a navigation system 11, a user interface 12, a sound controller 21, a display controller 22, an engine controller 23, a transmission controller 24, a brake controller 25, a steering controller 26, a lamp controller 27, a sound generator 31, a display unit 32, an engine actuator 33, a transmission actuator 34, a brake actuator 35, a steering motor 36, a lamp 37, and a bus 15, in addition to the driving support controller 5.

The image processor 3 performs predetermined image processing related to a recognition of an environment outside the vehicle based on image data obtained by the imager 2 through imaging the environment forward (i.e., typically in a traveling direction) of the vehicle. The image processing by the image processor 3 is conducted using the memory 4 that may be a nonvolatile memory.

The driving support controller 5 includes one or more microcomputers provided with one or more central processing units (CPUs) and one or more read only memories (ROMs), and one or more random access memories (RAMs). The driving support controller 5 executes various kinds of control processings for driving support (hereinafter, may be referred to as "the driving support control" or "the driving support control processing") based on, for example, the result of the image processing by the image processor 3, detected information obtained by the sensor 10, and an operational input from the user interface 12. The driving support controller 5 is coupled to the sound controller 21, the display controller 22, the engine controller 23, the transmission controller 24, the brake controller 25, the steering controller 26, and the lamp controller 27 via the bus 15, which similarly include one or more microcomputers, respectively. The driving support controller 5 can mutually communicate data with each of the controllers. The driving support controller 5 instructs necessary controller(s) among the controllers described above to cause the controller(s) to execute operations according to the driving support.

Here, the sensor 10 comprehensively represents various kinds of sensors and manipulanda provided in the vehicle. The sensors of the sensor 10 include a speed sensor 10A which detects a traveling speed of the vehicle; a brake switch 10B which is turned on and off when a brake pedal is operated and not operated, respectively; an accelerator opening sensor 10C which detects an accelerator opening based on a stepping amount of the accelerator; a steering angle sensor 10D which detects a steering angle; a yaw rate sensor 10E which detects a yaw rate; and a G sensor 10F which detects acceleration. A perimeter sensor 10G which detects a situation around the vehicle is also provided. The perimeter sensor 10G may include one or more radars, one or more cameras, etc. which detect objects (other vehicles, obstructions, etc.) rearward and sideways of the vehicle. Although not illustrated, the sensor 10 also includes other kinds of sensors, such as an engine speed sensor; an intake air amount sensor which detects an amount of intake air; a throttle position sensor which detects an opening of a throttle valve which intervenes in an intake passage and adjusts the amount of intake air supplied to each engine cylinder; a coolant temperature sensor which detects a coolant temperature indicative of an engine temperature; and an ambient temperature sensor which detects a temperature outside the vehicle.

The user interface 12 comprehensively represents various kinds of manipulanda which are operated by a vehicle operator. The manipulanda of the user interface 12 include an ignition switch through which a startup and a stop of the engine are instructed; a select lever through which a selection of an automatic transmission mode or a manual transmission mode of an automatic transmission (AT) vehicle, or an upshift or downshift in the manual transmission mode is instructed; an indication mode switch which switches indication information on a multifunction display (MFD) provided in the display unit 32 described later; and a blinker lever through which a turn-on of one of turn signals is instructed. Further, as the manipulanda related to the driving support control, a manual operation button for a self-driving mode and a manipulandum used when cancelling a lane change (if the operator disagrees) are also provided. As for the manipulandum for the disagreement operation (cancelling operation) of the lane change, a button exclusive to the disagreement operation may be provided, or the blinker lever may also be used as the manipulandum for the disagreement operation. That is, for example, when a lane change is proposed by the control as described later, an operation of the blinker lever in the opposite direction from the direction for the lane change may be used as an operation indicative of the operator intending the disagreement. Further, a manipulandum through which the operator instructs the lane change during a self-driving control is also provided. As for the manipulandum for the lane change instruction, a button exclusive to the lane change instruction may be provided, or the blinker lever may also be used as the manipulandum for the lane change instruction. That is, for example, the control is configured to recognize the operation of the blinker lever by the operator as an operation of demanding a lane change in an operating direction of the blinker lever when a lane change is not proposed during the self-driving control.

The navigation system 11 comprehensively represents a configuration for navigation processing, and includes one or more microprocessors which perform processings of route guidance and current location indication; a map database; a display device; an input device; and a sound output device. Detailed description of the configuration and processing of the navigation system 11 is omitted because it is publicly known; however, for the lane change control of this example in particular, the driving support controller 5 can acquire road information and lane information from the navigation system 11.

The sound generator 31 outputs guidance audio or sound, message audio or sound, etc. to the vehicle operator. For this reason, the sound generator 31 is provided with a sound source unit, a sound amplifying circuit unit, a speaker, etc. Necessary guidance audio or sound, etc. is outputted from the speaker by the sound generator 31 which is controlled by the sound controller 21. For example, as the sound output by the sound generator 31, the lane change proposal, a right or left turn, a traveling path, a situation, etc. under the self-driving control is notified to the operator. Note that the sound generator 31 and/or the sound controller 21 may be incorporated into the navigation system 11 or a car audio system in order to commonly use sound output function thereof.

The display unit 32 comprehensively represents various indicators, such as a speedometer and a tachometer, or a MFD, which are provided within a meter panel or an indicator panel installed in front of the operator, and a display device which presents other information to the operator. The MFD is displayable of various kinds of information, such as the total mileage of the vehicle, ambient temperature, and instantaneous fuel consumption, simultaneously or alternatively (i.e., by switching the indicated information). The lane change proposal may also be displayed in the automatic lane change control of this example. The display controller 22 controls the indication operation by the display unit 32 based on detection signals from predetermined sensors of the sensor 10, operational inputs through the manipulanda, etc. For example, a predetermined heads-up message, self-driving situation, lane change proposal, etc. may be displayed on the display unit 32 (e.g., a predetermined indication area of the MFD) as part of the driving support, based on an instruction from the driving support controller 5.

The engine controller 23 controls various actuators provided as the engine actuator 33 based on, for example, the detection signals from the predetermined sensors of the sensor 10, and/or the operational inputs through the manipulanda of the user interface 12. Various kinds of actuators according to engine drives, such as a throttle actuator which drives a throttle valve, and an injector which performs fuel injection are provided as the engine actuator 33. For example, the engine controller 23 controls a startup or stop of the engine in response to an operation of the ignition switch described above. Further, the engine controller 23 also controls a fuel injection timing, a fuel injection pulse width, a throttle opening, etc. based on the detection signals from the predetermined sensors, such as the engine speed sensor and the accelerator opening sensor 10C. Furthermore, during the self-driving control, the engine controller 23 controls necessary actuators provided as the engine actuator 33 based on an acceleration or deceleration instruction from the driving support controller 5.

The transmission controller 24 controls various kinds of actuators provided as the transmission actuator 34 based on the detection signals from the predetermined sensors of the sensor 10, the operational inputs through the manipulanda of the user interface 12, etc. Various kinds of actuators related to the transmission, such as a control valve which controls gear shifts of the automatic transmission, and a lock-up actuator which locks up a lock-up clutch, are provided as the transmission actuator 34. For example, when the automatic transmission mode is selected by the select lever described above, the transmission controller 24 controls the transmission by outputting gear-shift signals to the control valve according to a predetermined transmission pattern. In the manual transmission mode, the transmission controller 24 controls the transmission by outputting a gear-shift signal according to an upshift or downshift instruction by the select lever, to the control valve. Further, in the self-driving control, the transmission controller 24 controls the transmission by outputting a gear-shift signal to the control valve based on an upshift or downshift instruction from the driving support controller 5.

The brake controller 25 controls various kinds of actuators provided as the brake actuator 35 based on the detection signals from the predetermined sensors of the sensor 10, the operational inputs through the manipulanda of the user interface 12, etc. Various kinds of actuators related to the brake system, such as a fluid pressure control actuator which controls an output fluid pressure from a brake booster to a master cylinder, and a fluid pressure in a brake fluid piping, are provided as the brake actuator 35. For example, when the driving support controller 5 instructs braking, the brake controller 25 controls the fluid pressure control actuator described above to slow down the vehicle. Further, the brake controller 25 calculates slip ratios of wheels based on the detected information of the predetermined sensors (e.g., rotational speed sensors of wheel axles, and the speed sensor 10A), and causes the fluid pressure control actuator described above according to the slip ratios to increase or decrease the fluid pressure, thereby achieving a control of so-called antilock brake system (ABS).

The steering motor 36 is a motor which is attached to a steering mechanism and achieves steering separately from an operator's steering operation. The steering controller 26 drives the steering motor 36 based on an instruction from the driving support controller 5 to perform an automatic steering and a steering assistance of the operator. For example, the steering controller 26 executes the automatic steering during the self-driving control, and the automatic steering for a so-called lane keeping assist traveling.

The lamp 37 comprehensively represents various kinds of lighting and signaling devices mounted to the vehicle, such as headlamps, tail lamps, turn signals (blinkers), stop lamps (brake lights), etc. The lamp controller 27 controls lighting (blinking) of necessary lighting and/or signaling devices among the lamp 37, for example, based on the detection signals from the predetermined sensors of the sensor 10 and/or the operational inputs through the manipulanda of the user interface 12. The lamp controller 27 may control lighting (blinking) of the lamp 37 in response to an instruction from the driving support controller 5.

2. Function of Driving Support Controller

By the configuration of FIG. 1 described above, the self-driving can be achieved by the driving support controller 5 issuing necessary instructions to each component. For example, the driving support controller 5 suitably achieves the self-driving by multiply instructing an acceleration or a deceleration to the engine controller 23, a gear shift to the transmission controller 24, a braking to the brake controller 25, and a steering to the steering controller 26, in accordance with the route information, road information, perimeter situations, etc. A lane change may be required (or recommended) during the self-driving control. In such a case, the driving support controller 5 performs the automatic lane change, and a functional configuration for the automatic lane change is described with reference to FIG. 2.

Figure 2:
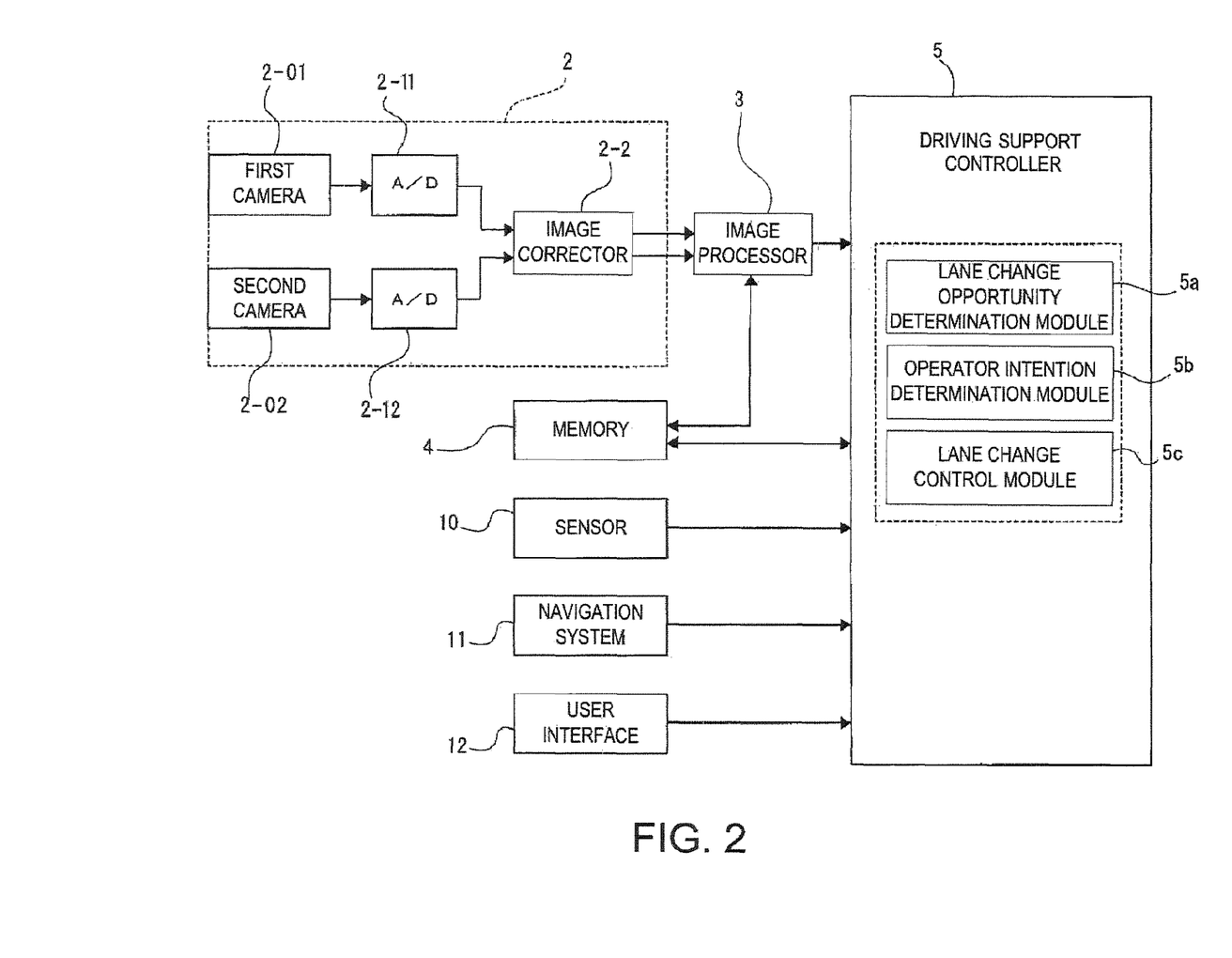
FIG. 2 illustrates a functional configuration of a driving support controller of the example.

FIG. 2 illustrates the functional configuration for the automatic lane change along with acquiring routes of necessary information. Although the driving support controller 5 is provided with various kinds of functions for the self-driving control and the various kinds of driving support controls, only functions for the lane change control will be described below. The driving support controller 5 includes a lane change opportunity determination module 5a, an operator intention determination module 5b, and a lane change control module 5c, for functions of the lane change control. Each of the functions is implemented, for example, by software which runs in a microcomputer as the driving support controller 5.

The lane change opportunity determination module 5a determines whether it is an opportunity in which a lane change is possible based on a predetermined condition determination during a self-driving activated state in which an acceleration/deceleration and a steering of the vehicle are automatically controllable. Further, the lane change opportunity determination module 5a gives an instruction to the display controller 22 and the sound controller 21 when determined that the lane change is possible, to control these controllers to present the operator the lane change proposal. The lane change proposal is processing when the automatic lane change is about to be executed, to notify the operator of the execution of the automatic lane change by one or both of visual indication and sound to give the operator an opportunity of showing (inputting) his/her intention whether he/she agrees to (the execution of) the lane change. The operator intention determination module 5b performs processing of determining the operator's intention for the lane change proposal. The lane change control module 5c performs a control processing by controlling the acceleration/deceleration and the steering of the vehicle to execute the automatic lane change in response to the operator intention determination module 5b determining that the operator has agreed with the lane change proposal.

Although a detailed example of the processing will be described later, the lane change opportunity determination module 5a determines in the case of this example, a lane change condition based on various kinds of information during the self-driving control. When the condition is met, the lane change opportunity determination module 5a proposes a lane change to the right or to the left to the operator as the lane change proposal. Here, the operator intention determination module 5b determines an operator's intention, i.e., an agreement to the lane change proposal or a disagreement with the lane change proposal (a cancellation of the lane change). For example, if a predetermined period of time is lapsed without the operator operating anything in particular to the lane change proposal, the operator intention determination module 5b determines that the operator has agreed with the lane change. Of course, a more positively agreeing operation, such as pressing "an agreement button," may also be asked to the operator, and the operator intention determination module 5b may determine the operator's agreement based on the operation. When determined that the operator has agreed, the lane change control module 5c actually starts the lane change control. That is, the lane change is performed by issuing the necessary instructions to the steering controller 26, the engine controller 23, the brake controller 25, the transmission controller 24, etc.

On the other hand, the operator can also disagree (the cancellation of the lane change control) upon the proposal of the lane change. When the lane change is proposed, the operator operates a disagreement operation through the predetermined manipulandum of the user interface 12 if he/she does not want to perform the lane change. If the operation indicative of the intention of disagreement is performed by the operator, the lane change control module 5c does not start the lane change control. Note that, even after the lane change control is started by the lane change control module 5c, the disagreement operation (for a termination of the lane change) may be accepted to cancel the lane change operation.

The lane change opportunity determination module 5a keep performing the determination of the lane change condition regardless of the execution or the cancellation of the lane change, and if the condition is met, the lane change opportunity determination module 5a executes another proposal of the lane change. The determination condition of the lane change opportunity encompasses various kinds of conditions, such as follows:

[Determination Conditions Due to Traveling Paths and Road Conditions]

(1) A right turn or a left turn is getting closer, and the vehicle should move to a suitable lane (a right turning traffic lane etc.);

(2) An obstruction exists in the lane ahead of the vehicle, and the vehicle should move to another suitable lane;

(3) The lane is reduced or increased ahead of the vehicle, and the vehicle should move to another suitable lane; and (4) A preceding vehicle is traveling at a remarkably low speed, and the vehicle should pass the preceding vehicle.

[Determination Condition Due to Compliance to Traffic Regulation]

(1) Whether the currently traveling lane is within a lane change suspended section.

[Determination Conditions Due to Safety Reason]

(1) Whether a straight road continues for a while;

(2) Whether a road width is equal to or more than a predetermined width:

(3) Where the operator can view forward and rearward clearly; and (4) A state of other vehicles around the vehicle is suitable for the lane change.

The determination conditions of the lane change opportunity may be other various kinds of conditions, and combinations of the conditions may also be various.

For the determination of the various kinds of conditions, the lane change opportunity determination module 5a acquires information from the respective components. For example, the lane change opportunity determination module 5a acquires information based on analyzed images from the image processor 3 which analyzes images captured by the imager 2. The imager 2 is provided with a first camera 2-01, a second camera 2-02, an A-D converter 2-11, an A-D converter 2-12, and an image corrector 2-2. Each of the first camera 2-01 and the second camera 2-02 includes a camera optical system and an image sensor. The image sensor typically includes one ore more charged coupled devices (CCDs) or one ore more complementary metal oxide semiconductors (CMOSs). A photographic object image is formed on an image pick-up surface of the image sensor by passing through the camera optical system, and the image sensor acquires an electrical signal according to an amount of received light for each pixel. The first camera 2-01 and the second camera 2-02 are disposed so as to be able to measure a distance by a so-called "stereo imaging method." The electrical signals acquired by the first camera 2-01 and the second camera 2-02 are then supplied to the A-D converters 2-11 and 2-12, respectively, and the A-D converters 2-11 and 2-12 convert the analog electrical signals to digital signals (A/D conversion). Thus, the digital image signal (captured image data) indicative of a luminosity value can be acquired per pixel in a predetermined gradation manner. Each image data obtained via the A-D converters 2-11 and 2-12 are inputted into the image corrector 2-2. The image corrector 2-2 applies a correction to each image data in order to correct, for example, a mounting error of the first and second cameras 2-01 and 2-02 by using an affine transformation, or luminosity values such as a removal of noise.

Thus, each image data obtained by the imager 2 is recorded and held in the memory 4 by the image processor 3. The image processor 3 performs various kinds of image processings based on each image data obtained by the stereo imaging. Thus, a lane detection, a preceding vehicle detection, an obstruction detection, a traffic light detection, etc. can be performed. The lane change opportunity determination module 5a can use the detected information acquired by the image processor 3 for determinations of a road condition, a lane state, an obstruction state, traveling states of other vehicles, etc. forward of the vehicle.

The lane change opportunity determination module 5a also uses various kinds of the sensor information of the sensor 10 for the condition determination. For example, states (existence of other vehicles etc.) on the sides and rearward of the vehicle acquired by the perimeter sensor 10G can be used for the determination of the lane change opportunity. A current traveling speed acquired by the speed sensor 10A, a curve situation acquired by the steering angle sensor 10D and/or the yaw rate sensor 10E, etc. can also be used for the determination. The lane change opportunity determination module 5a can also use information from the navigation system 11 (e.g., route information, information on the number of lanes of each road, approaches to right and left turn locations, traffic regulation information at the current position, etc.) for the determination.

In this example, the lane change opportunity determination module 5a determines whether it is possible to change the lane at the present time based on the various kinds of information, and if possible, the lane change opportunity determination module 5a causes the sound generator 31 and the display unit 32 to execute the proposal of the lane change. Note that, during a period when the lane change proposal is suspended, the lane change opportunity determination module 5a suspends the execution of the lane change proposal even if it is determined that the lane change is possible.

The information accepted through the user interface 12 is also inputted into the driving support controller 5. For example, an operational input related to the driving support, such as ON/OFF of the self-driving mode, is performed. As for the lane change control, the operator intention determination module 5b monitors the disagreement operation with the lane change proposal. If the disagreement operation is detected, the suspended period of the lane change proposal is then provided. The operator intention determination module 5b also monitors the operation for the lane change instruction through the predetermined manipulandum of the user interface 12. This is because the lane change may be required by the operation of the operator during which the lane change is not proposed.

3. Lane Change Control of First Instance

Figure 3:
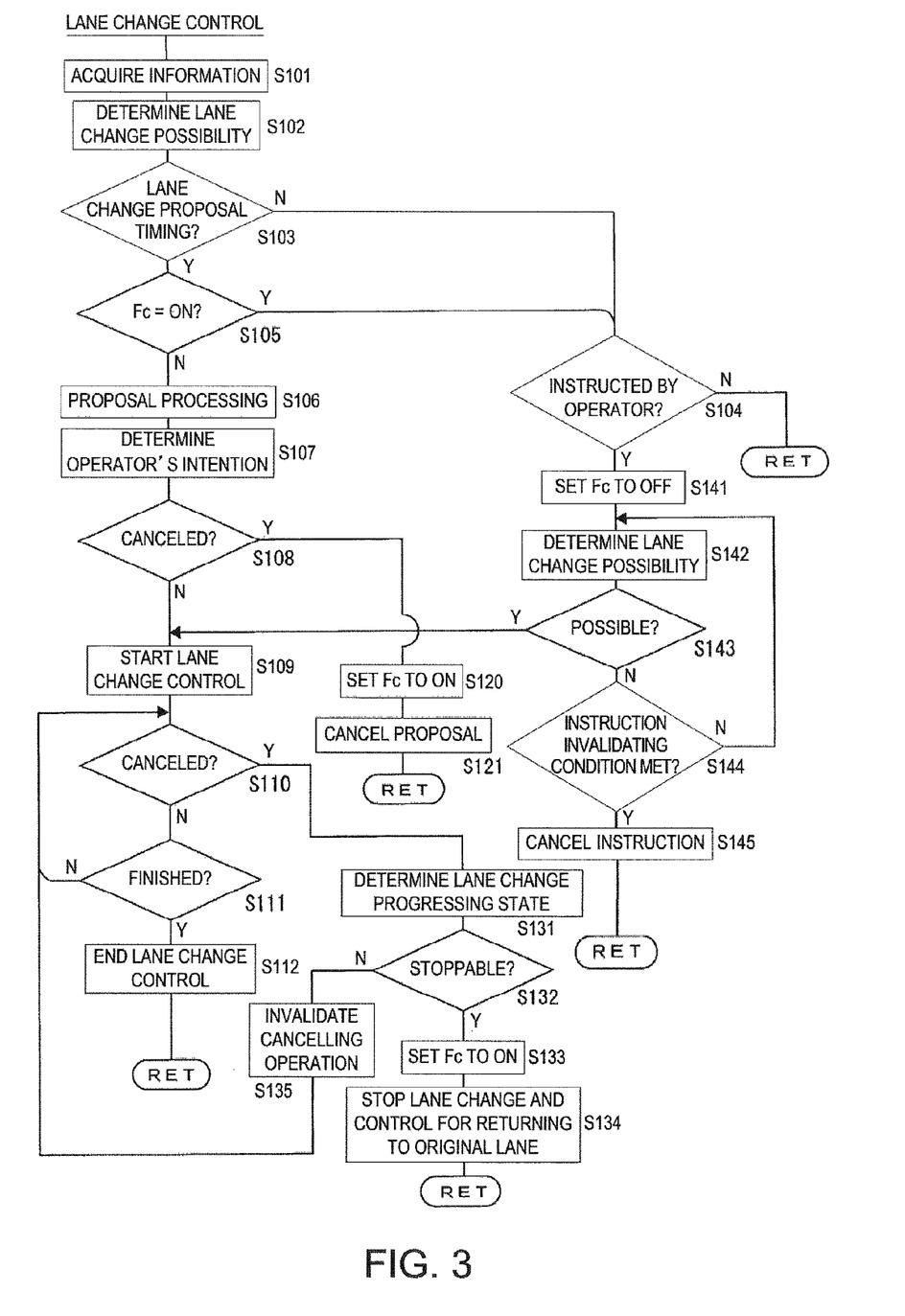
FIG. 3 is a flowchart illustrating a lane change control processing of a first instance.

Hereinafter, a first instance of processing of the example for the lane change control by the driving support controller 5 will be described with reference to FIGS. 3 and 4. Note that processing of FIGS. 3, 4 and 5 of a second instance which will be described later is lane change control processing that is executed by the driving support controller 5 in which respective functions as the lane change opportunity determination module 5a, the operator intention determination module 5b, and the lane change control module 5c cooperate with each other. The driving support controller 5 performs the lane change control of FIG. 3 as one of the various kinds of processings of the self-driving control. The lane change control of FIG. 3 is repeatedly executed during the self-driving control, for example, at every predetermined timing.

The driving support controller 5 acquires the information for the lane change opportunity determination at Step S101. The driving support controller 5 acquires, for example, the detected information on other vehicles located forward of the vehicle, the road condition, etc. from the image processor 3, the detected information from the sensor 10, the course and lane information from the navigation system 11, as described above. The driving support controller 5 performs the lane change possibility determination using the acquired information at Step S102. The lane change possibility determination is processing that determines whether the various kinds of conditions described above are met to determine whether it is the lane change opportunity, i.e., to determine whether it is a timing at which the lane change is recommended and it is an opportunity where the lane change can safely be executed.

If determined not to be the lane change opportunity at present, the driving support controller 5 transits from Step S103 to Step S104 to examine whether there is the operation for the lane change instruction by the operator. If the operation for the lane change instruction from the operator is not detected in particular, the driving support controller 5 ends one cycle of the lane change control of FIG. 3.

On the other hand, if determined that the lane change condition is currently met, the driving support controller 5 determines that it is the opportunity to perform the lane change proposal at Step S103. In such a case, the driving support controller 5 transits to Step S105 to examine ON/OFF of a cancellation flag Fc. The cancellation flag Fc is an internal flag that is set to ON in response to the operator performing the disagreement operation (the cancellation of the lane change) with the lane change proposal, and is set to OFF when a predetermined cancelling condition is met. The lane change proposal is suspended during a period when the cancellation flag Fc is ON. Thus, the driving support controller 5 examines the cancellation flag Fc at Step S105, and if the cancellation flag Fc is ON, the driving support controller 5 transits to Step S104 without controlling the lane change proposal.

If the cancellation flag Fc is OFF at Step S105, the driving support controller 5 transits to Step S106 to perform the lane change proposal processing. For example, the driving support controller 5 instructs to the display controller 22 and/or the sound controller 21 to execute the lane change proposal to a right lane or a left lane with the visual indication and/or sound. Therefore, the operator can recognize based on the lane change proposal that the lane change is about to be performed during the self-driving.

The driving support controller 5 performs the operator intention determination at Step S107. For example, the driving support controller 5 waits for a predetermined period of time (e.g., several seconds) after the lane change proposal is started, and during this period, the driving support controller 5 monitors whether the operator performs the disagreement operation, for example, the operation of the blinker lever in the opposite direction as described above.

If the predetermined period of time is lapsed without detecting the disagreement operation in particular, the driving support controller 5 determines that the operator has agreed with the lane change proposal (not canceling). In such a case, the driving support controller 5 transits from Step S108 to Step S109 to start the lane change control. That is, the driving support controller 5 issues necessary instructions to the steering controller 26, the engine controller 23, the brake controller 25, the transmission controller 24, etc. to cause them to start the actual lane change. In addition, the driving support controller 5 instructs the lamp controller 27 to start the blinker lamp to blink in the lane change direction.

Then, the driving support controller 5 monitors at Step S110 whether the cancelling operation of the lane change is performed by the operator, while executing the lane change control. Further, the driving support controller 5 monitors, for example, the information from the image processor 3 to determine whether the lane change is finished at Step S111. If the lane change is finished, the driving support controller 5 transits from Step S111 to Step S112 to end the lane change control. At this time, the driving support controller 5 instructs the lamp controller 27 to stop the blinking of the blinker lamp. Thus, the driving support controller 5 ends one cycle of the lane change control.

On the other hand, when the lane change proposal is performed at Step S106, if the operator operates, for example, the blinker lever in the opposite direction from the proposed lane change direction to show his/her intention of disagreement with the lane change, and if the driving support controller 5 determines the operator's intention of disagreement at Step S107, it then transits from Step S108 to Step S120. The driving support controller 5 sets the cancellation flag Fc to ON at Step S120. The driving support controller 5 cancels the lane change proposal at Step S121 and ends one cycle of the lane change control processing without causing to execute the lane change control in particular.

The operator may perform the cancelling operation after the lane change control is started at Step S109. In such a case, the driving support controller 5 detects the cancelling operation at Step S110, and transits to Step S131. In such a case, the driving support controller 5 determines a progressing state of the lane change at that time. For example, the driving support controller 5 determines as the progressing state of the lane change whether it is no more in a state where the lane change can be stopped (i.e., a state where the lane change can be safely stopped). The stoppable state may be defined by a various kinds of boarder situations, such as (1) a state where the center of the vehicle in the vehicle width direction crosses over the lane line; (2) a state where an ⅓ position of the vehicle in the vehicle width direction crosses over the lane line; and (3) a state where a vehicle body side of the vehicle reaches the lane line between the current traveling lane and an adjacent destination lane of the lane change. The boarder situations may of course be other than the situations described above, or some situations may be used as follows. For example, one of the situations (1), (2) and (3) is used as reference, and the driving support controller 5 determines to be unstoppable if the progressing state has reached the reference situation, while determining stoppable if the progressing state has not reached the reference situation. The driving support controller 5 can determine, for example, the progressing state of the lane change operation in which the references are used, based on the information on the positional state of the vehicle body of the vehicle and the position of the lane line which are obtained from the image processor 3.

If the situation has already reached the unstoppable state when the cancelling operation is performed, the driving support controller 5 transits from Step S132 to Step S135 to handle the cancelling operation as invalid, and then returns to Step S110. That is, the cancelling operation is not accepted in this case, and the lane change control continues until it is finished. Thus, the vehicle will not be repeatedly crossing the lane line in a zigzag manner by ending the lane change without accepting the termination (stopping) of the lane change.

If the lane change has not progressed much and the lane change is determined to be stoppable when the cancelling operation is performed, the driving support controller 5 transits from Step S132 to Step S133 to first set the cancellation flag Fc to ON. The driving support controller 5 then stops the lane change at Step S134, and performs a control for returning the vehicle to the original lane. For example, the driving support controller 5 first instructs the lamp controller 27 to change the blinking of the blinker lamp in the opposite direction. Thus, for example, if the right blinker lamp is blinked for the lane change to the right lane, the left blinker lamp is blinked instead. The driving support controller 5 then starts a lane returning control. That is, the driving support controller 5 issues necessary instructions to the steering controller 26, the engine controller 23, the brake controller 25, the transmission controller 24, etc. to start processing to return the vehicle to the original lane. When the completion of the return to the original lane is confirmed based on the information from the image processor 3 etc., the driving support controller 5 ends the original lane returning control, and also stops the blinking of the blinker lamp.

For example, if the stoppable situation is determined based on (1) or (2) described above, the driving support controller 5 performs the original lane returning operation in response to the cancelling operation even if the lane change is once started and the vehicle body somewhat crosses the lane line. Therefore, the operator can instruct the cancellation of the automatic lane change and the automatic returning to the original lane by the sensuous operation. In addition, since the vehicle body of the vehicle may slightly cross the lane line in such a case, the driving support controller 5 executes the blinking of the blinker lamp in the opposite direction to notify the return to the original lane to following vehicles. Thereby, it is suitable also for safety. Note that, if determining the stoppable situation based on (3) described above, since the determination to be stoppable of the lane change is only limited within a period during which the vehicle stays in the original lane, the processing performed at Step S134 may only be the stopping of the lane change control and the blinker stop control.

During the processings described so far, if the operator performs the disagreement operation with the lane change proposal, or if the operator performs the cancelling operation after the lane change is started, the driving support controller 5 sets the cancellation flag Fc to ON (S120, S133). During the period when the cancellation flag Fc stays ON, the lane change proposal will not be executed because the flag is examined at Step S105. The cancellation flag Fc is set to OFF when any one of the conditions, such as the operator's lane change instruction, the lapse of the preset time, and other cancellation conditions, is met.

If the operation demanding the lane change is detected, the driving support controller 5 transits from Step S104 to Step S141 to set the cancellation flag Fc to OFF. Such a case corresponds to the operator's positive demand of the lane change, and since the driving support controller 5 does not yet determine that the lane change is possible in such a case, it then performs a lane change possibility determination at Step S142 (similar to S102). The driving support controller 5 transits from Step S143 to Step S109 when it determines that the lane change is possible, to start the lane change control. The driving support controller 5 continues the lane change possibility determination of Step S142 while examining an instruction invalidating condition at Step S144, before the condition allowing the lane change is met. The instruction invalidating condition includes a lapse of a certain period of time or a detection of the operator's lane change cancelling operation. If the instruction invalidating condition is met, the driving support controller 5 performs processing to cancel the instruction of the lane change demand at Step S145 and ends one cycle of the lane change control.

As illustrated at Step S141 described above, the driving support controller 5 sets the cancellation flag Fc to OFF when the operator performs the positive operation of the lane change demand. In such a case, if determined that the lane change is possible in subsequent processings of FIG. 3, the driving support controller 5 transits in the order of Step S103, S105 and S106 to execute the control of the lane change proposal.

Figure 4:
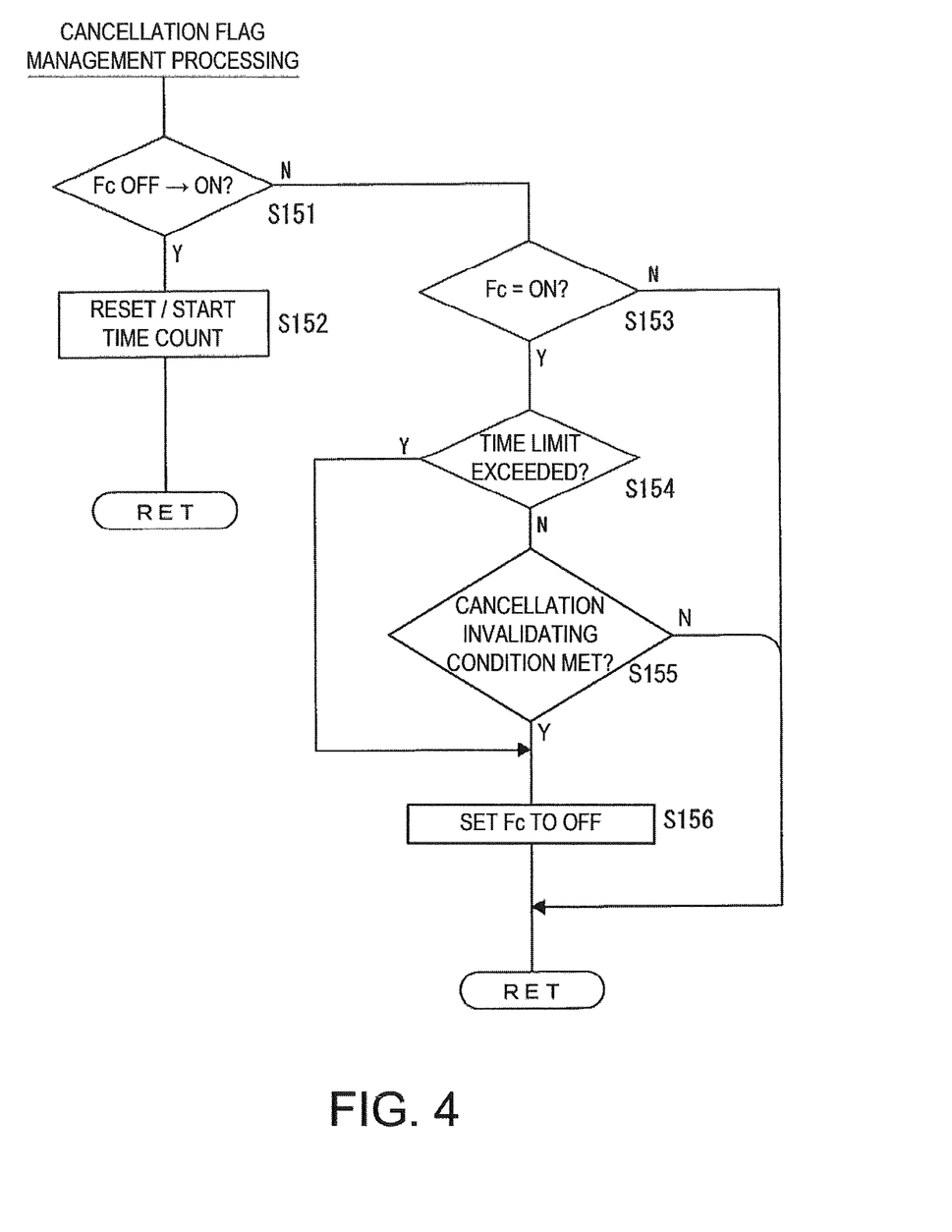
FIG. 4 is a flowchart illustrating a cancellation flag management processing of the instance.

Further, the driving support controller 5 also performs processing of FIG. 4 in parallel to the processing of FIG. 3 for the cancellation flag Fc. If the driving support controller 5 detects that the cancellation flag Fc is turned to the ON state from the OFF state, it transits from Step S151 to Step S152 to start a time count of a certain preset time period. The preset time may be about 30 seconds, 5 minutes, 10 minutes, or 30 minutes, for example. Alternatively, any time period may be selected by the operator as the preset time. During the period when the cancellation flag Fc stays ON, the processing of FIG. 4 transits in the order of Step S151, S153 and S154 each time. At Step S154, the driving support controller 5 examines whether the time count of the preset time exceeds a time limit. If exceeding the time limit, the driving support controller 5 sets the cancellation flag Fc to OFF at Step S156. Even if not exceeding the time limit, the driving support controller 5 determines whether a cancellation invalidating condition is met at Step S155, and if the condition is met, the driving support controller 5 sets the cancellation flag Fc to OFF at Step S156. The cancellation invalidating condition includes a change in preceding vehicles ahead of the vehicle, a change in perimeter and road condition, turning an ignition switch ON, for example.

In the processings of FIGS. 3 and 4 described above, if the operator performs the disagreement (cancellation) operation with the lane change proposal or the lane change operation, the driving support controller 5 will not then perform the lane change proposal (S106) during the period when the cancellation flag Fc stays ON. On the other hand, if the cancellation flag Fc is set to OFF due to the cancelling condition, the driving support controller 5 resumes to the state where the lane change proposal is performed.

4. Lane Change Control of Second Instance

Figure 5:
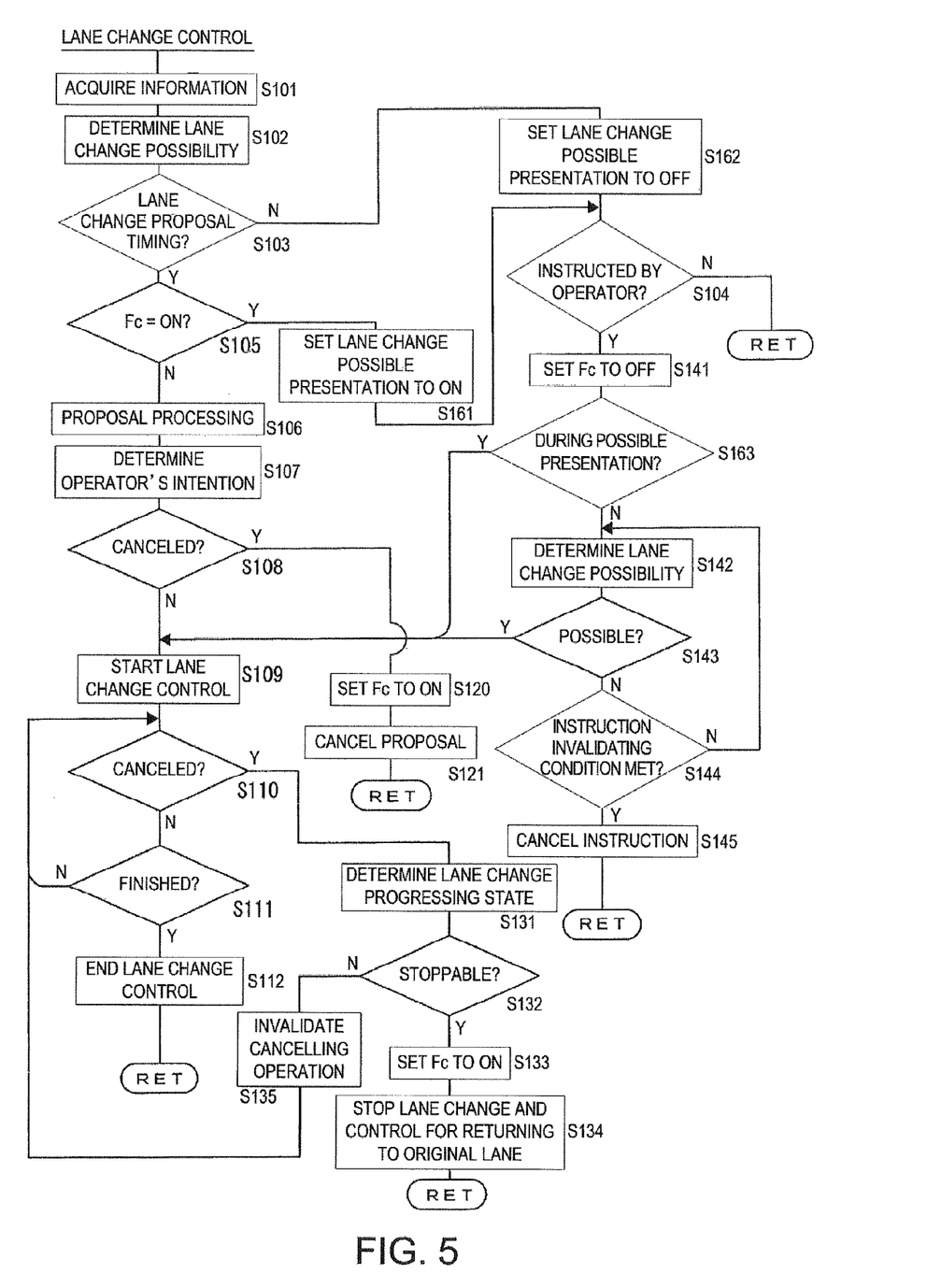
FIG. 5 is a flowchart illustrating a lane change control processing of a second instance.

A second instance of the lane change control processing of the driving support controller 5 is described with reference to FIG. 5. Note that since Steps S101-S145 are the same as those of FIG. 3, explanation thereof is omitted in this instance. FIG. 5 illustrates processing which has Steps S161, S162 and S163 in addition to the processing of FIG. 3. Note that the processing of FIG. 4 is also performed in parallel to the processing of FIG. 5. The second instance of FIG. 5 illustrates an example in which a presentation of a situation where the lane change is possible is performed, although the lane change proposal is not performed, during the period when the cancellation flag Fc stays ON.

If determined to be the situation where the lane change is not possible by the lane change possibility determination of Step S102, the driving support controller 5 always keeps the presentation of the lane change possible presentation of Step S162 at an OFF state. On the other hand, if not performing the lane change proposal (S106) because the cancellation flag Fc is ON even when it is in the lane change possible state, the driving support controller 5 performs a control to set the lane change possible presentation to ON at Step S161. For example, the driving support controller 5 instructs the display controller 22 to execute the lane change possible presentation by the display unit 32.

The lane change proposal at Step S106 is a presentation for notifying the operator of the automatic lane change being about to be performed and confirming his/her intention of agreeing/disagreeing to the automatic lane change, for example. On the other hand, the lane change possible presentation at Step S161 is only a presentation that tells the operator that it is currently in the lane change possible situation as a result of the lane change possibility determination. That is, if the cancellation flag Fc is ON, the lane change proposal is not performed because the operator does not demand the lane change; however, since the lane change possibility determination has been performed, possible/impossible as the determination result is presented at Steps S161 and S162.

When the operator's lane change demanding operation is detected at Step S104, the driving support controller 5 may just start the lane change control at Step S109 as it is if the lane change possible presentation is performed at Step S163. This is because it is a valid timing of the result which determined to be the lane change being possible at Step S102.

5. Conclusion and Modifications

According to the example and instances described above, the following effects can be obtained. The driving support controller 5 determines, as the function of the lane change opportunity determination module 5a, whether it is the opportunity to change the traveling lane by determining the predetermined condition in the self-driving activated state, while performing the control to present the lane change proposal to the operator (S106) when determined that the lane change is possible. Further, the driving support controller 5 determines, as the function of the operator intention determination module 5b, the operator's intention (agree/disagree) to the lane change proposal. Further, the driving support controller 5 controls, as the function of the lane change control module 5c, the acceleration/deceleration and the steering of the vehicle to execute the automatic lane change, in response to the determination by the operator intention determination module 5b that the operator agrees to the lane change proposal. If the operator intention determination module 5b determines that the operator's intention is in disagreement with the lane change proposal, the cancellation flag Fc is set to ON at Step S120. Thus, the lane change opportunity determination module 5a does not execute the control for presenting the lane change proposal to the operator during the period until the predetermined cancelling condition is met and the cancellation flag Fc is turned to OFF. When the lane change is proposed to the operator after the lane change is determined to be possible, the automatic lane change is not performed if the operator disagrees. Therefore, the self-driving which respects the operator's intention is possible. Here, when the operator performs the operation for declaring his/her intention of disagreement, the lane change proposal is not performed for a while because it can be assumed that the operator does not demand the lane change. Therefore, it is prevented that the lane change proposals are repeatedly performed regardless of the operator cancelling the lane change and the operator feels troublesome.

Further, after the automatic lane change is started by the lane change control module 5c, the cancellation flag Fc is also set to ON at Step S133 when the operator intention determination module 5b determines that the operator's intention is in disagreement and the lane change control module 5c stops the automatic lane change control. Thus, the lane change opportunity determination module 5a does not perform the control that presents the lane change proposal to the operator during the period until the cancelling condition by which the cancellation flag Fc is turned OFF is met. Therefore, the operator can perform the cancelling operation (disagreement with the automatic lane change) also after the automatic lane change operation is started. Also in such a case, it is assumed that the operator will not demand the lane change for a while and the lane change proposal will not be performed, thereby avoiding the situation in which the operator feels troublesome. Note that, even when the cancelling operation is to be invalidated at Step S135 of FIGS. 3 and 5, the cancellation flag Fc may be configured to be set to ON because the operator does not have much intention to demand the lane change.

Further, the cancelling condition (the condition by which the cancellation flag Fc is turned OFF) may be a detection of the lane change instruction by the operator. That is, the operator can perform a predetermined operation to instruct the execution of the lane change and the turning OFF of the cancellation flag Fc (the lane change proposal will be executed later on) also during a period the lane change proposal is not being performed, because it can be assumed that the operator does not demand the lane change. Therefore, the lane change control conforming to the operator's intention can be achieved. That is, it is determined that the operator has an intention that he/she does not mind to change the lane, and the control is then resumed to the state of performing the lane change proposal. The cancelling condition may be a lapse of a preset time. Thus, a period, during which the lane change proposal is not performed because it can be assumed that the operator does not demand the lane change, can be terminated by the lapse of the preset time. Therefore, it can be prevented that a state where the lane change proposal and the automatic lane change are not performed continues forever. Note that it can be considered that there may be suitable preset time for each individual operator in the case of setting the cancellation flag Fc to OFF by the lapse of the time limit. Thus, it is preferred that the operator is allowed to select the preset time until the time limit (i.e., a time period until validating the lane change proposal).

Further, there are other effective cancelling conditions. For example, setting the cancellation flag Fc to OFF in response to a detection of a change in a preceding vehicle detected by the image processor 3 may be suitable for the lane change according to the preceding vehicle. For example, it is supposed that, after the operator disagreed with the lane change proposal because he/she has no intention to pass a normally-traveling preceding vehicle, the preceding vehicle is turned to be a very-slowly-traveling vehicle. In such a case, the operator may now think that he/she wants to change the lane for a passing. Of course, the operator may just perform the lane change demanding operation in such a case; however, it may also be preferred that the cancellation flag Fc is set to OFF to permit the driving support controller 5 to perform the lane change proposal. Alternatively, it may also be suitable that the cancellation flag Fc is set to OFF in a certain perimeter and road condition, such as when determined that the vehicle enters into a highway from a local street, the vehicle is moved into a suburb from a city area, and vice versa. This is because the operator may change his/her intention against the lane change according to the situation. Similar things can be said for setting the cancellation flag Fc to OFF by turning the ignition switch ON or OFF.

In the first instance, when the predetermined time is lapsed while the operator operates nothing to the lane change proposal, it is determined that the operator agrees to the lane change at the driver intention determination processing (S107). That is, the operator's operation can be simplified by not requiring the agreement operation, thereby improving the operator's comfortableness during the self-driving. Note that the agreement operation may be required also in such a case. The agreement operation may be a predetermined operation of a switch; however, if it is an operation of the blinker lever in the lane change direction, this operation is also easy for the operator (i.e., it matches with the operator's sense). That is, the operation of the blinker lever in the lane change direction may be "agreement," and the operation in the opposite direction may be "disagreement."

In the second instance, when the driving support controller 5 determines that it is the opportunity to change the lane in the period during which the control for presenting the lane change proposal to the operator is not performed, the driving support controller 5 may execute the presentation of a timing at which the lane change is possible to the operator (S161). Even if the state where the lane change is possible is notified to the operator without positively performing the lane change proposal, it does not require the operator for any operation, thereby avoiding giving too much trouble to the operator. Under the condition described above, the operator can be presented of the suitable timing for the lane change. After the operator confirms the presentation and performs the lane change demanding operation, the lane change control is started (S161, S104, S141, S163 and S109 in this order). Note that the lane change possible presentation may be performed only by an indication by the display unit 32 so that the operator feels as less troublesomeness as possible; however, a sound output from the sound generator 31 may also be usable.

In the meantime, when the lane change possible presentation is performed in the second instance, another lane change possible presentation may not be performed if the operator performs the cancelling operation. In such a case, the automatic lane change may not be performed without also performing the lane change possibility determination of Step S102.

Note that this invention may not be limited to the configurations, the processings and the modifications of the instances described above, and further various kinds of modifications may also be possible without prejudice.

The invention claimed is:

1. A driving support controller, comprising:
   a lane change opportunity determination module that determines whether there is an opportunity to change a traveling lane based on a predetermined condition in a self-driving activated state in which an acceleration, a deceleration, and a steering of a vehicle equipped with the driving support controller are automatically controlled, and performs a control to present a lane change proposal to an operator of the vehicle when the lane change opportunity determination module determines that a lane change is possible;
   an operator intention determination module that determines an operator's intention regarding the lane change proposal; and
   a lane change control module that controls the acceleration, the deceleration and the steering of the vehicle to perform an automatic lane change control in response to a determination of the operator intention determination module that the operator agrees to the lane change proposal,
   wherein, when the operator intention determination module determines that the operator's intention is in disagreement with the lane change proposal, the lane change opportunity determination module suspends the control to present the lane change proposal to the operator until a predetermined cancelling condition is met, and
   wherein, when the operator intention determination module determines that the operator's intention is in disagreement after the lane change control module starts the automatic lane change, the lane change control module determines, based on a progressing state of the lane change, whether to stop the automatic lane change control.

2. The driving support controller of claim 1, wherein, when the operator intention determination module determines that the operator's intention is in disagreement and the lane change control module stops the automatic lane change control after the lane change control module starts the automatic lane change, the lane change opportunity determination module also suspends the control to present the lane change proposal to the operator until the cancelling condition is met.

3. The driving support controller of claim 1, wherein the cancelling condition comprises a detection of a lane change instruction by the operator.

4. The driving support controller of claim 2, wherein the cancelling condition comprises a detection of a lane change instruction by the operator.

5. The driving support controller of claim 1, wherein the cancelling condition comprises an elapse of a preset time.

6. The driving support controller of claim 2, wherein the cancelling condition comprises an elapse of a preset time.

7. The driving support controller of claim 1, wherein the lane change opportunity determination module suspends the control to present the lane change proposal but performs a control to indicate to the operator an occurrence of the opportunity to change the lane when the lane change opportunity determination module determines the opportunity occurs to change the lane during a period in which the control to present the lane change proposal to the operator is suspended.

8. The driving support controller of claim 2, wherein the lane change opportunity determination module suspends the control to present the lane change proposal but performs a control to indicate to the operator an occurrence of the opportunity to change the lane when the lane change opportunity determination module determines the opportunity occurs to change the lane during a period in which the control to present the lane change proposal to the operator is suspended.

9. The driving support controller of claim 3, wherein the lane change opportunity determination module suspends the control to present the lane change proposal but performs a control to indicate to the operator an occurrence of the opportunity to change the lane when the lane change opportunity determination module determines the opportunity occurs to change the lane during a period in which the control to present the lane change proposal to the operator is suspended.

10. The driving support controller of claim 4, wherein the lane change opportunity determination module suspends the control to present the lane change proposal but performs a control to indicate to the operator an occurrence of the opportunity to change the lane when the lane change opportunity determination module determines the opportunity occurs to change the lane during a period in which the control to present the lane change proposal to the operator is suspended.

11. The driving support controller of claim 5, wherein the lane change opportunity determination module suspends the control to present the lane change proposal but performs a control to indicate to the operator an occurrence of the opportunity to change the lane when the lane change opportunity determination module determines the opportunity occurs to change the lane during a period in which the control to present the lane change proposal to the operator is suspended.

12. The driving support controller of claim 6, wherein the lane change opportunity determination module suspends the control to present the lane change proposal but performs a control to indicate to the operator an occurrence of the opportunity to change the lane when the lane change opportunity determination module determines the opportunity occurs to change the lane during a period in which the control to present the lane change proposal to the operator is suspended.

* * * * *